DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED AUGUST 5, 1975

937 O.G. 13

T937,005

METAL VESSEL HAVING A COATING OF AN AROMATIC POLYSULFONE RESIN AND A SILICONE RESIN

Joseph A. Vasta, Woodbury, N.J., assignor to E. I. du Pont de Nemours and Company, Wilmington, Del.

Continuation of abandoned application Ser. No. 340,846, Mar. 13, 1973. This application May 31, 1974, Ser. No. 476,137

**Int. Cl. C08g *51/04***

U.S. Cl. 260—375 B

No Drawing. 16 Pages Specification

The metal vessel has at least one surface coated with a composition of an aromatic polysulfone resin and a silicone resin; this coating has excellent release properties, stain and grease resistance, excellent hardness, adhesion and abrasion resistance and the vessel is particularly useful as high quality bakeware and as other cooking containers; the finish applied to the exterior of the vessel provides a decorative protective finish.